(12) United States Patent
Kangas et al.

(10) Patent No.: US 8,914,040 B2
(45) Date of Patent: Dec. 16, 2014

(54) METHOD AND ARRANGEMENT IN A TELECOMMUNICATION SYSTEM

(75) Inventors: Ari Kangas, Lidingö (SE); Bo Hagerman, Tyresö (SE); Yngve Selén, Uppsala (SE); Iana Siomina, Solna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 190 days.

(21) Appl. No.: 13/497,315

(22) PCT Filed: Sep. 24, 2009

(86) PCT No.: PCT/SE2009/051062
§ 371 (c)(1), (2), (4) Date: Mar. 21, 2012

(87) PCT Pub. No.: WO2011/037501
PCT Pub. Date: Mar. 31, 2011

(65) Prior Publication Data
US 2012/0264450 A1  Oct. 18, 2012

(51) Int. Cl.
*H04W 24/00* (2009.01)
*H01Q 1/24* (2006.01)
*G01S 5/02* (2010.01)
*G01S 13/87* (2006.01)
*H04W 64/00* (2009.01)
*G01S 1/04* (2006.01)
*H01Q 25/00* (2006.01)
*H04B 7/06* (2006.01)

(52) U.S. Cl.
CPC .............. *H04W 64/00* (2013.01); *H01Q 1/246* (2013.01); *G01S 5/0226* (2013.01); *G01S 13/878* (2013.01); *H04B 7/0695* (2013.01); *G01S 1/042* (2013.01); *H01Q 25/002* (2013.01)
USPC ................... 455/456.1; 455/456.3; 455/456.5

(58) Field of Classification Search
CPC ... H04W 64/00; H04W 4/02; H04L 29/08657
USPC ........ 455/456.1–457; 343/751, 757, 777, 754
See application file for complete search history.

(56) References Cited

U.S. PATENT DOCUMENTS

| | | | |
|---|---|---|---|
| 7,376,429 B2 | 5/2008 | Choukroun et al. | |
| 2003/0222820 A1* | 12/2003 | Karr et al. | ..................... 342/457 |
| 2005/0113117 A1 | 5/2005 | Bolin et al. | |
| 2005/0159154 A1 | 7/2005 | Goren | |
| 2005/0202858 A1 | 9/2005 | Farber et al. | |

FOREIGN PATENT DOCUMENTS

| | | |
|---|---|---|
| EP | 1056304 A2 | 11/2000 |
| EP | 1783921 A1 | 5/2007 |
| GB | 2353159 A | 2/2001 |
| WO | 0143469 A1 | 6/2001 |
| WO | 0250563 A1 | 6/2002 |
| WO | 2008024041 A1 | 2/2008 |

* cited by examiner

*Primary Examiner* — Marcos Torres
(74) *Attorney, Agent, or Firm* — Coats & Bennett, P.L.L.C.

(57) ABSTRACT

Method and arrangement in a network node 302 for improving conditions for ground-based positioning of mobile terminals 310 in a wireless communication system. The method and arrangement concerns adaptation of an antenna arrangement 308 associated with the network node 302, so that a virtual positioning cell 306 is formed in a positioning radio resource, in which positioning reference signals are transmitted or received.

14 Claims, 8 Drawing Sheets

METHOD AND ARRANGEMENT IN A TELECOMMUNICATION SYSTEM

TECHNICAL FIELD

The invention relates generally to a mechanism used when performing ground-based positioning of mobile terminals.

BACKGROUND

In recent years, a large variety of services have been developed for wireless networks to enrich user experience by exploiting the possibility of identifying the current geographical position of the user by using ground-based positioning. In addition to commercial services, operators may be required to provide basic emergency services and to meet the minimum coverage and position accuracy requirements provided by some regulatory bodies, e.g. the FCC (Federal Communications Commission) in the US.

One way of performing ground-based positioning is to let the UEs (User Equipment) listen for different BSs (Base Stations) and determine the distance to each BS based upon time of arrival and other parameters. Using this information, the position of a UE on a 2D map can be determined if the UE can "hear", i.e. receive signals from, and take the time measurements of at least 3 BSs. In the standardisation collaboration $3^{rd}$ Generation Partnership Project (3GPP), positioning for the Radio Access Technology (RAT) Long-Term Evolution (LTE) using the so-called OTDOA (Observed Time Difference of Arrival) method is currently being standardized. The OTDOA method is illustrated in FIG. 1, and will be described in more detail below.

However, modern cellular RATs, such as LTE, are by design not well suited for positioning, due to e.g. the effective cell isolation. In order to minimize the inter-cell interference, the network planners try to achieve an as good isolation as possible between cells. From a system capacity standpoint, it is beneficial if a UE within a serving cell receives as little interference as possible, which implies that the signal strength within the serving cell from network nodes not serving the UE should be as low as possible. FIG. 2 shows three cells 208, 210 and 212 in a system with a desired cell isolation. A mobile terminal 214, located within the cell 208 is only able to receive signals from network node 202, and not from network nodes 204 or 206.

Current implementations of ground-based positioning, e.g. those standardized in 3GPP, try to achieve acceptable positioning performance by using various interference mitigation techniques both at the system level and by means of signalling design. In order to achieve acceptable positioning performance, it may then be necessary to increase the measurement time, the measured bandwidth, or to introduce special low-interference radio resources, e.g. subframes, dedicated for positioning, during which some transmission restrictions apply, e.g. concerning user data transmissions or signalling, and during which the positioning measurements are performed.

The purpose of these alternative solutions is thus to, despite low signal levels from many BSs, make sure that strong enough signals can be received by a UE from the necessary number of BSs, so that the time-of-arrival of the received signals can be accurately estimated, or similarly, for UL (Up-Link) positioning, make sure that a sufficient number of BSs receive strong enough signals from a UE, so that the BSs can estimate the time-of-arrival of the received signals with high enough precision. This area, however, still leaves room for further improvements.

SUMMARY

It would be desirable to achieve a support mechanism, which improves conditions for ground-based positioning. It is an object of the invention to address at least some of the issues outlined above. These objects may be met by a method and an arrangement according to the attached independent claims.

According to one aspect, a method is provided for improving conditions for ground-based positioning of mobile terminals in a wireless communication system. The method comprises adapting the configuration of an antenna arrangement associated with a network node so that a virtual positioning cell is formed in a positioning radio resource. The method further comprises transmitting or receiving reference signals used for positioning in said positioning radio resource, using the adapted antenna arrangement.

According to another aspect, an arrangement is adapted to improve conditions for ground-based positioning of mobile terminals in a wireless communication system. In this aspect, an antenna arrangement control unit is adapted to adapt the configuration of an antenna arrangement in the network node so that it forms a virtual positioning cell in a positioning radio resource. Further, a transmitting and/or receiving unit within the arrangement is adapted to transmit and/or receive reference signals used for positioning in said dedicated radio resource, using the adapted antenna arrangement.

The above method and arrangement may be used to improve reception of positioning reference signals both at UL and DL positioning measurements, i.e. when a number of network nodes perform positioning measurements on reference signals transmitted by a mobile terminal, and when positioning measurements are performed by a mobile terminal on reference signals transmitted by a number of network nodes.

In one embodiment, the virtual positioning cell has a reduced cell isolation as compared to a traffic cell associated with the network node and/or is designed to overlap with other virtual positioning cells.

In one embodiment, the virtual positioning cell is formed by changing the radiation pattern of at least one antenna, which is generally used for communication of user data traffic. The radiation pattern could be changed in the vertical and/or the horizontal dimension.

This embodiment may be used to achieve the improved conditions for positioning without adding extra hardware in form of antennas.

In another embodiment, the virtual positioning cell is formed using a dedicated antenna, i.e. an antenna other than the antennas used for communication of user data traffic.

The positioning radio resource used in the above embodiments may occur according to a predetermined schedule, and/or occur dynamically according to received instructions.

An advantage of the above aspects and embodiments is that the cell isolation can be temporarily reduced. This is beneficial for positioning algorithms which rely on receiving signals from or in several network nodes or antenna sites, and will lead to more accurate positioning or to a reduction of the overhead required for positioning in a communication system.

BRIEF DESCRIPTION OF THE DRAWINGS

The invention will now be described in more detail by means of exemplary embodiments and with reference to the accompanying drawings, in which.

DETAILED DESCRIPTION

Briefly described, a solution is provided for supporting ground-based positioning by improving the possibility for e.g. a mobile terminal located in a serving cell to receive signals from a plurality of network nodes located in other cells, which received signals could be used for positioning purposes, or vice versa, i.e. improving the possibility for e.g. a plurality of network nodes located in different cells to receive signals transmitted from a certain mobile terminal. This is achieved by adapting an antenna arrangement in a way that will be described in more detail below.

One exemplary method of ground-based positioning according to the prior art, the OTDOA method, which was mentioned earlier, will now be described.

Figure 1:
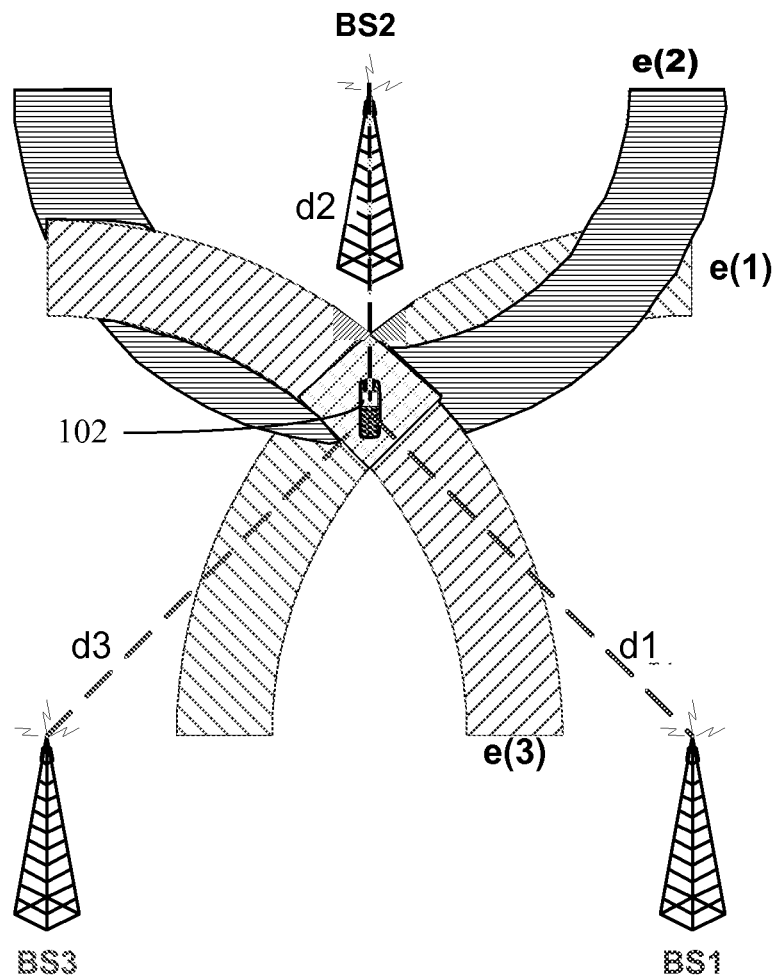
FIG. 1 is a schematic view illustrating the OTDOA method according to the prior art.
Figure 2:
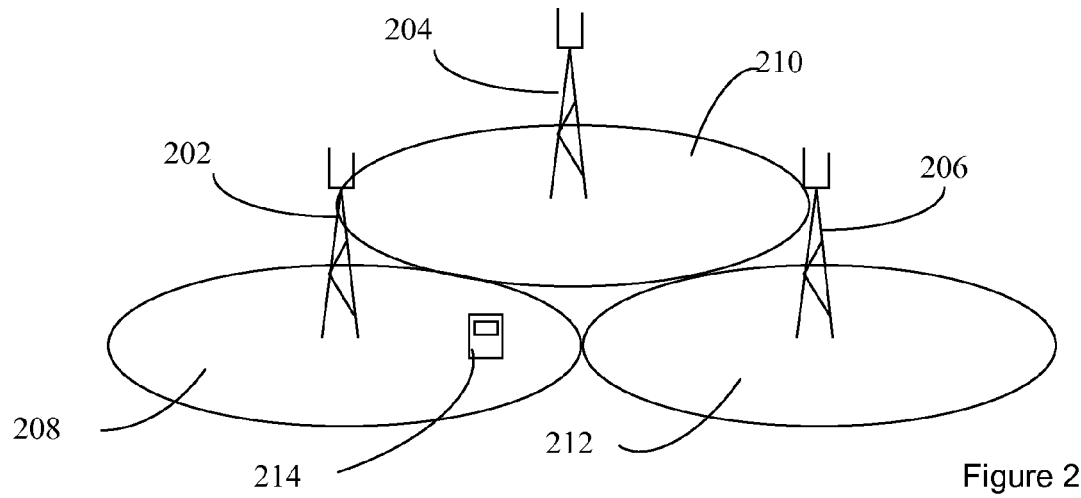
FIG. 2 is a schematic view illustrating three cells in a cellular communication system according to the prior art.

The principle behind OTDOA based positioning is illustrated in FIG. 1. A mobile terminal 102 to be positioned is located at the distance d(n) from the base stations BS(n). The mobile terminal listens for positioning signals from the base stations, and estimates a position e(n) relative each base station, having knowledge of the coordinates of the transmitting antennas of the base stations. The OTDOA principle can be written in mathematical form as follows:

$$t_R^1 = t_T^1 + \sqrt{(x-x_1)^2 + (y-y_1)^2}/c + b + v_1 \quad (1a)$$

$$t_R^2 = t_T^2 + \sqrt{(x-x_2)^2 + (y-y_2)^2}/c + b + v_2 \quad (1b)$$

$$t_R^N = t_T^N + \sqrt{(x-x_N)^2 + (y-y_N)^2}/c + b + v_N \quad (1N)$$

where:
$t_R^i$: Time of reception for ith antenna (measured)
$t_T^i$: Time of transmission for ith antenna
$x_i, y_i$: Coordinates of ith antenna (known)
c: Speed of light
x, y: Coordinates of UE computed by solving equations in UE or in network node b: Receiver clock bias
$v_i$: Measurement error associated with antenna i The equations (1a)-(1N) can be solved for the unknowns (x,y,b) whenever N≥3 and the geometry of the base stations is good. One solution is to use numerical optimization solutions based on Taylor series expansions of equations (1a)-(1N). These methods are well known in the art. The method described above is based on received signals in the DL (DownLink). A similar positioning problem can be formulated for UL (UpLink) positioning, where several BSs may register the signal from one UE and use equations similar to those above to determine the position of the UE.

As stated earlier, the deliberate cell isolation in modern cellular RATs renders the RATs not well suited for positioning. This cell isolation can be achieved, e.g. by elevating the antennas and tilting them downwards, so that the antenna radiation pattern, e.g. the main antenna lobe, covers a relatively small area. Further, modern directional antennas are designed in such a way that cell isolation is improved, by that the unwanted sidelobes of a main antenna lobe are relatively insignificant.

In order to improve the conditions for implementations of ground-based positioning, such as the OTDOA method, a mechanism is invented, which enables a UE located within a cell to receive signals from e.g. network nodes located in other cells, and further enables e.g. network nodes located in different cells to receive signals from a certain UE located in yet another cell. The mechanism reduces the cell isolation during positioning measurements.

Within this document, a conventional cell used for user data traffic is referred to as a "traffic cell" or "Tcell". A cell used for positioning is referred to as a "virtual positioning cell" or "VPcell". The term "positioning radio resource", refers to a resource in time, frequency or code, or any combination thereof, which is used for positioning. The term positioning radio resource should not be interpreted as necessarily equaling certain radio resource units e.g. within LTE, such as resource block or resource element.

The term "cell" may sometimes be used to implicate some extent of isolation. In this document, however, the expression "virtual positioning cell" does not implicate isolation, but is used in the meaning "an area covered by radiation of at least a certain power from an antenna arrangement used for positioning", and where virtual positioning cells are meant to, at least partly, overlap with other virtual positioning cells in order to enable a reliable ground-based positioning. The power of the radiation from the antenna(s) within the virtual positioning cell should be above a certain threshold in order to be useful.

Within this document, an antenna used for the purpose of communicating user data traffic is referred to as a "traffic antenna". A traffic antenna could be reconfigured to become a "positioning antenna". Antennas used for the purpose of positioning are referred to as "positioning antennas". The term "dedicated positioning antenna" is used in situations where the positioning antenna is not a partly and/or temporarily reconfigured traffic antenna.

Figure 3:
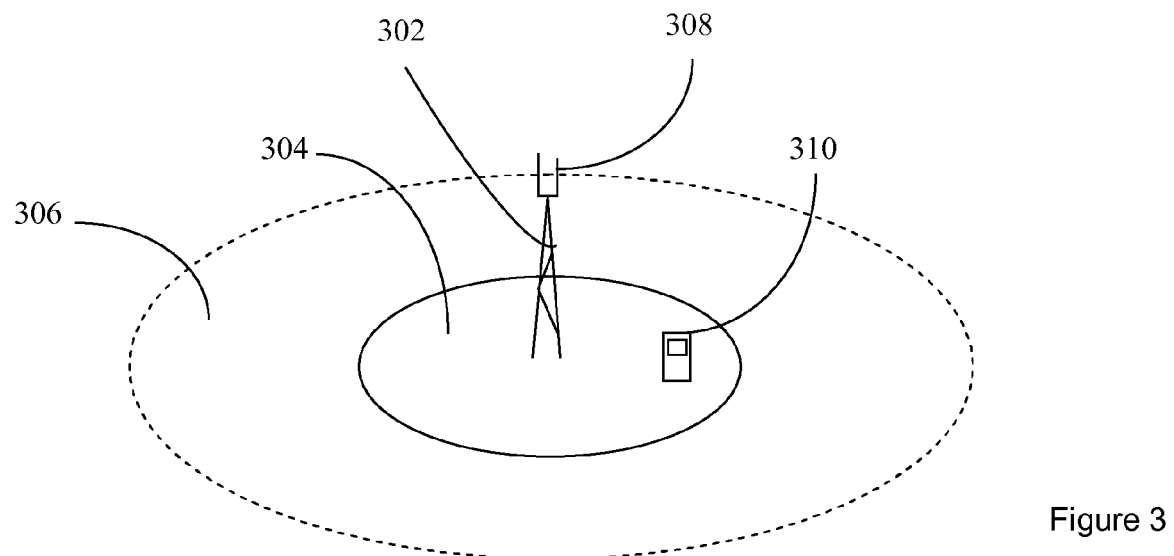
FIG. 3 is a schematic view illustrating a traffic cell and a virtual positioning cell according to an embodiment of the invention.

FIG. 3 is a schematic view illustrating a network node 302, e.g. a BS, having an antenna arrangement 308 generating a certain coverage in form of a traffic cell 304 according to one embodiment. In a positioning radio resource, such as a channel or a time slot, the configuration of the antenna arrangement 308 is adjusted so that the coverage changes to form a virtual positioning cell 306 in the positioning radio resource. The virtual positioning cell 306 is illustrated by a dashed line in FIG. 3. In the other, non-positioning radio resources, the coverage remains or returns to being that of the traffic cell 304. The positioning radio resource is normally not used for regular data traffic.

Figure 4:
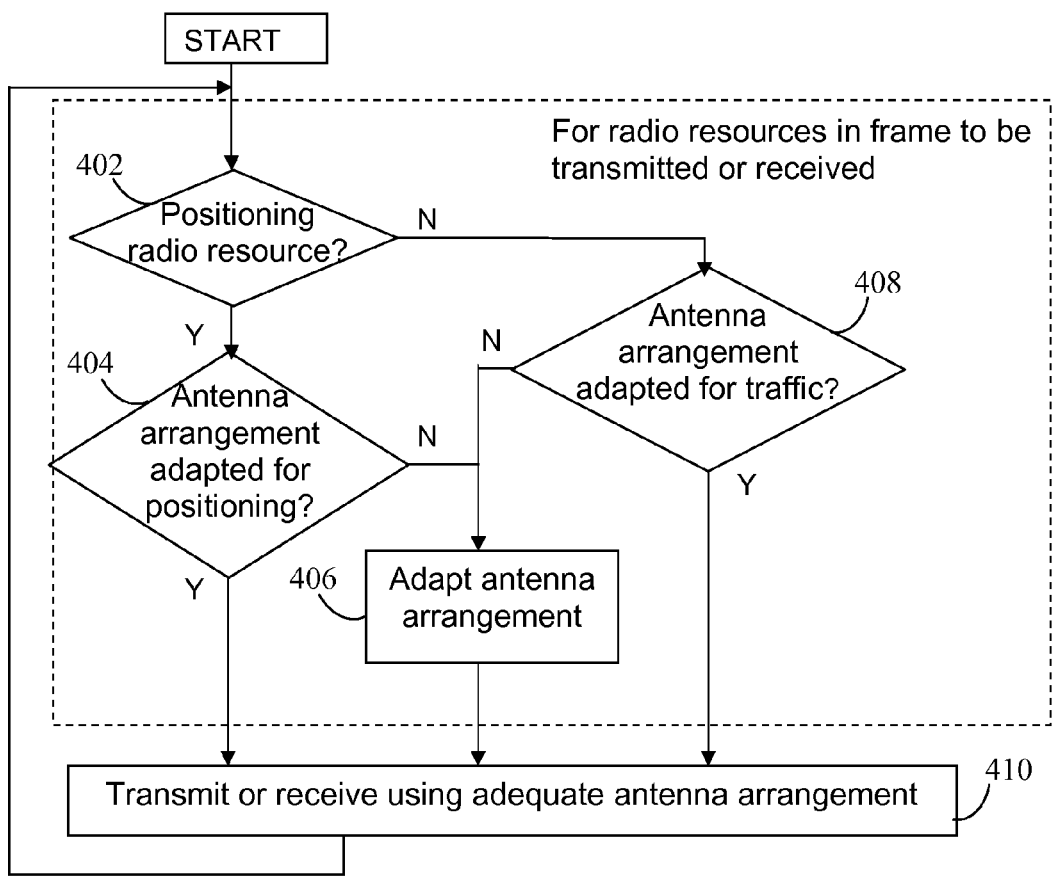
FIG. 4-5 are flow charts illustrating method steps according to different embodiments.

FIG. 4, which is a flow chart, illustrates the described positioning procedure in a network node according to one embodiment. Initially, it is determined 402 whether a radio resource to be transmitted or received is a positioning radio resource or not. If a radio resource to be transmitted or received is a positioning radio resource, it is determined 404 if the configuration of the antenna arrangement is adapted to form a virtual positioning cell in the positioning radio resource. If the antenna arrangement configuration is not adapted for positioning, an adaptation 406 of the antenna arrangement configuration is performed before a transmission or reception 410 of the positioning radio resource is performed. In the embodiment shown in FIG. 4, it is also determined 408 if the antenna arrangement is adapted for traffic purposes if an evaluated radio resource is found to be a non-positioning radio resource, and if found necessary, the antenna arrangement configuration is adapted 406 for traffic purposes. Alternatively, the antenna arrangement configuration could be adapted to e.g. always use traffic settings if not explicitly instructed otherwise, in which case the evaluations 404, 408 concerning if the antenna arrangement is adapted to the adequate purpose may not be necessary.

The positioning radio resources could be predefined and occur according to a certain scheme, which then should be known to all parties concerned. Alternatively or in combination with the predefined scheme, the positioning radio resources could be dynamically set by e.g. one node in the network or by several nodes in cooperation. Information on when the dynamically set positioning radio resources will occur should then be supplied to all parties concerned, in order for the concerned parties to be able to perform activities related to positioning in the adequate radio resources. The information could e.g. be broadcasted with other system information, or could be signaled in a dedicated way to each UE upon request and/or periodically and/or triggered by an event.

In situations where the parties which are to receive or transmit positioning reference signals do not have information concerning when the positioning radio resources occur, the parties could e.g. perform a blind search for positioning reference signals or positioning radio resources.

Figure 5:
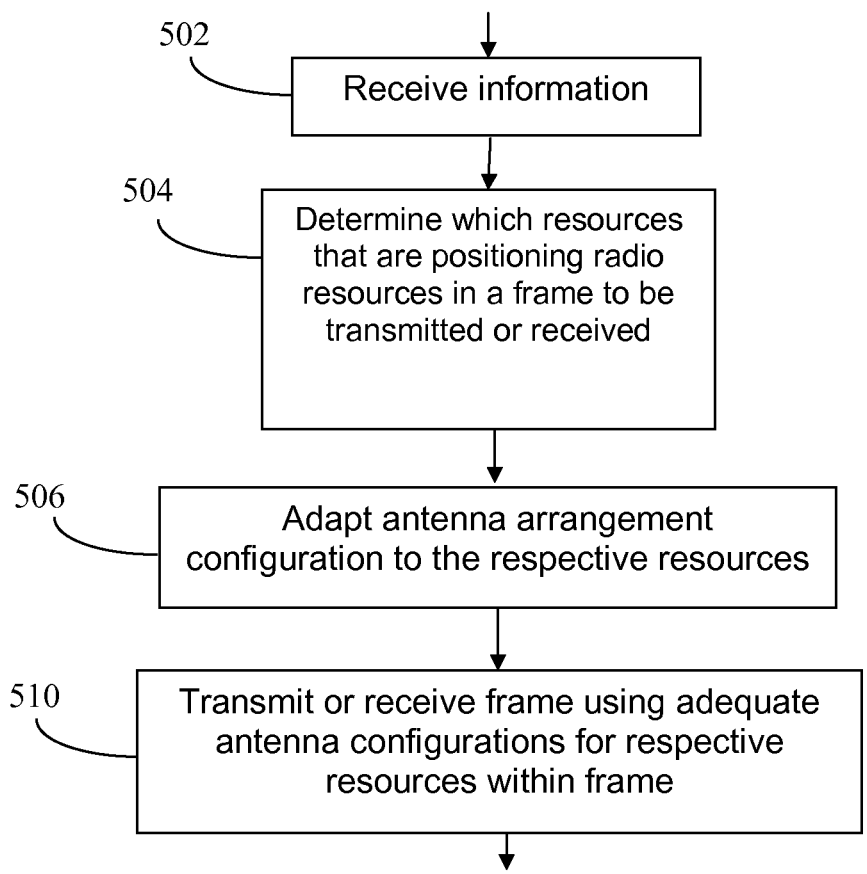

FIG. 5 shows an illustration of an embodiment of the invention in a network node. Initially, information is received 502 from e.g. a network node and/or a management node concerning which radio resources that are used for positioning. This information could e.g. be received once when connecting to a network, and/or be dynamically updated. Typically, transmissions are made for a certain amount of radio resources at the time, a so called transmission frame, or the like. The received information is checked to determine 504 which radio resources of such a frame to be transmitted or received that are positioning radio resources. Then, the configuration of the antenna arrangement of the network node is adjusted 506 for the respective radio resources. Then, the transmission frame is transmitted or received using adequate antenna arrangement configurations for the respective radio resources.

In the previous examples, it is assumed that the receiver and/or transmitter of positioning reference signals has information on which radio resources that are used for positioning. This information may be attained in different ways, as described earlier. The details on how this information is attained is, however, not relevant for the scope of this invention.

Figure 6:
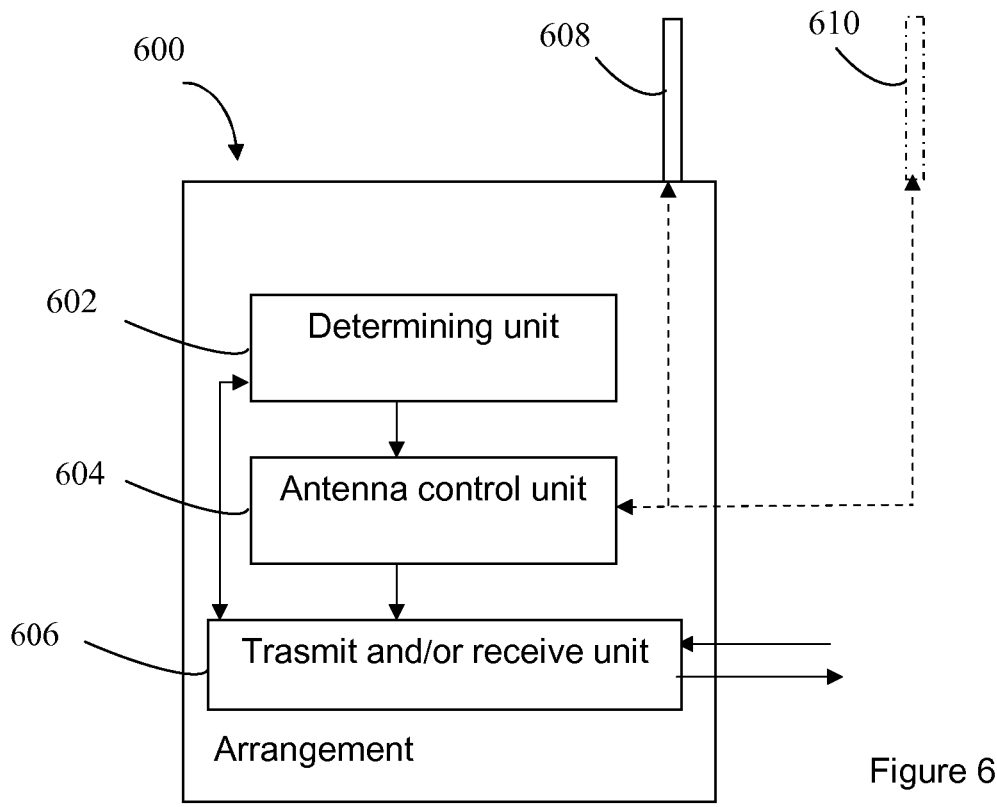
FIG. 6 is a block diagram illustrating an arrangement in a network element according to one embodiment.

FIG. 6, which is a block diagram, illustrates an arrangement 600 in a network node according to one embodiment. In a determining unit 602, it is determined if a radio resource to be transmitted or received is a positioning radio resource. In an antenna control unit 604, it is attended to that an antenna arrangement configuration is adapted in accordance with the result from the determining unit 602, i.e. so that a virtual positioning cell is formed in the positioning radio resources, and a traffic cell is formed in the non-positioning radio resources. The antenna arrangement could comprise one or more traffic antennas and/or one or more dedicated positioning antennas. The antenna(s) could be approximately co-located with the arrangement 600, as illustrated by antenna 608, or remote, as illustrated by antenna 610. In a transmit and/or receive unit 606 it is attended to that the data, whether positioning signals or some other data, is transmitted or received using the adequate antenna arrangement. A virtual positioning cell and a traffic cell may exist simultaneously in the time dimension in situations where the positioning radio resource is located in the frequency and/or code dimension.

Figure 7:
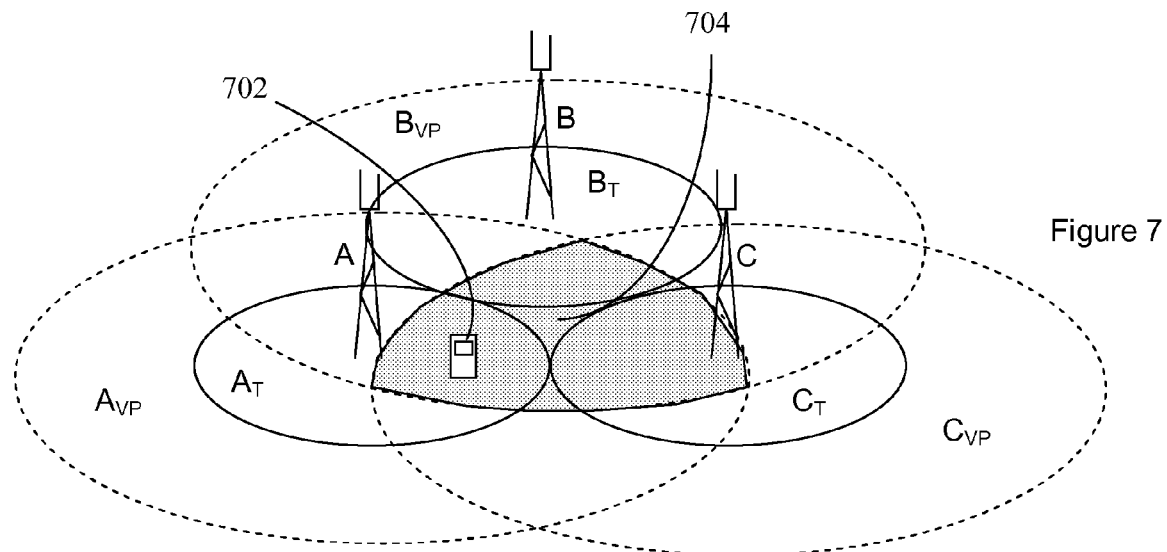
FIG. 7 is a schematic view illustrating three cells in a cellular communication system according to an embodiment of the invention.

FIG. 7 is a schematic view illustrating three neighbouring network nodes, A, B and C, according to an embodiment of the invention. Each network node is associated with a traffic cell, $A_T$, $B_T$ and $C_T$ respectively, illustrated by solid circles in the figure. A mobile terminal 702 located within traffic cell $A_T$ cannot receive signals transmitted from network nodes located in the neighbouring cells $B_T$ and $C_T$, or reach network nodes B and C when transmitting signals during normal traffic conditions. However, in a positioning radio resource, the configuration of the antenna arrangements of the respective network nodes A, B and C are adapted to form the virtual positioning cells $A_{VP}$, $B_{VP}$ and $C_{VP}$, respectively, illustrated by dashed circles. A mobile terminal located within the area 704 where the three virtual positioning cells $A_{VP}$, $B_{VP}$ and $C_{VP}$ overlap, can now receive positioning signals transmitted from network nodes A, B and C, and can reach network nodes A, B and C when transmitting positioning signals in the positioning radio resource.

Figure 8:
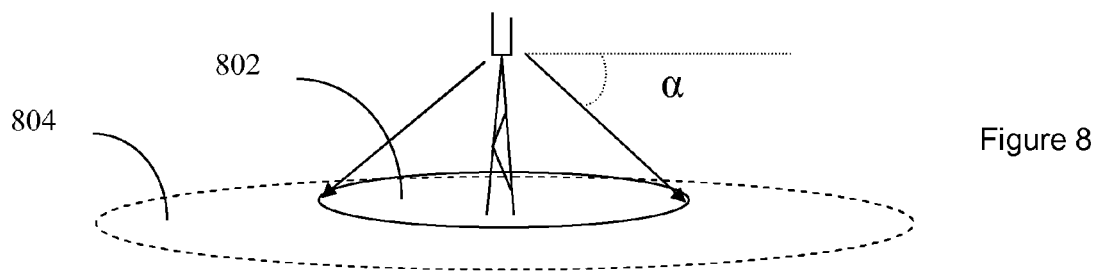
FIG. 8 is a schematic view illustrating a downtilt of an antenna radiation pattern during communication of user data traffic.
Figure 9:
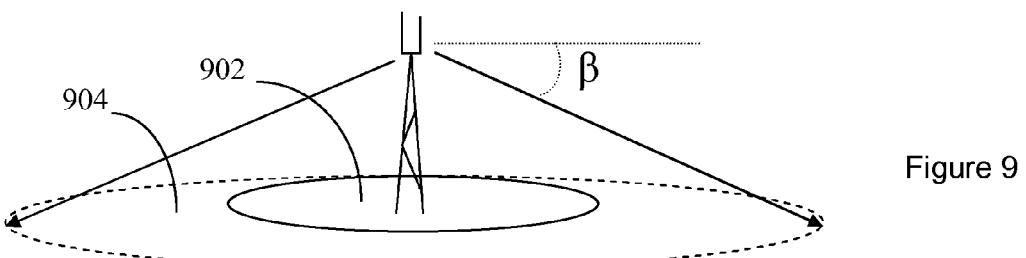
FIG. 9 is a schematic view illustrating a downtilt of an antenna radiation pattern during a radio resource dedicated for positioning.

One way of implementing the virtual positioning cell is to change the radiation pattern of the antenna(s) used for communication of data traffic. For example, the vertical downtilt of an antenna radiation pattern could be altered in order to cover a larger area. FIGS. 8 and 9 illustrate such a change of the vertical downtilt of the radiation pattern of an antenna arrangement, according to one embodiment. FIG. 8 illustrates the antenna arrangement configuration in traffic radio resources, where the antenna radiation pattern has a vertical downtilt of $\alpha$ degrees, relative an imagined plane parallel to the ground. FIG. 9 illustrates the antenna arrangement configuration in positioning radio resources, where the antenna radiation pattern has a vertical downtilt of $\beta$ degrees, relative the same imagined plane parallel to the ground. Since $\beta<\alpha$, the radiation from the antenna configuration illustrated in FIG. 9 covers a larger area 904 than the radiation from the antenna configuration illustrated 802 in FIG. 8. The radiation pattern of the antenna(s) used for communication of data traffic could be changed also in a horizontal dimension, in order to achieve a virtual positioning cell, which is well adapted to its purpose. The vertical and/or horizontal radiation pattern could be changed using various techniques, such as beam switching, antenna arrays or active antennas.

Such a change in antenna radiation pattern may require that the antenna configuration can be changed on a short time scale, e.g. on an LTE subframe basis, i.e. within milliseconds. The antenna configuration can be varied such that it sometimes is set to maximize the cell isolation, and sometimes to maximize the positioning performance, i.e. in some sense reduce the cell isolation. In one embodiment, the antenna configuration can be periodically changed to improve the positioning performance during one or a few subframes, which are used solely or partly for positioning purposes, while "non-positioning" subframes use an antenna configuration optimized for cell isolation, i.e. system capacity.

In embodiments where the same antenna(s) is used for communication of data traffic and for positioning, it is assumed that the antenna configuration can be changed from e.g. subframe to subframe and possibly only within a subband of the transmission bandwidth. Such an antenna configuration would comprise a set of parameters, which could be dynamically adjusted, e.g. electrical tilt or antenna beam parameters.

There exist a number of techniques for steering antennas and changing signal coverage. Some of them are typically associated with a static antenna configuration, such as e.g. height, azimuth or mechanical tilt, while others can be thought of in the context of more dynamic antenna configuration, such as e.g. beam switching or electrical tilt. The more static antenna configuration is typically associated with physical changes being applied to the antenna, whilst the dynamic antenna configuration is often about changing the antenna radiation pattern, for example, by changing the amplitude and/or phase of the antenna elements. A possible implementation of controlling electrical tilt, which in essence is a phase shift to the antenna elements, is by means of a Remote Electrical Tilt (RET) system, which allows for a remote control of the antenna radiation pattern in the vertical plane and thus simplifies the process of antenna downtilting and reduces the site maintenance costs. The existing RET technology does not allow for changing the antenna radiation pattern dynamically, e.g. in the order of a subframe length. However, this may become achievable in the not too distant future, for example, by means of antenna arrays. Another existing technique is beam switching, which allows a change of the radiation pattern of an antenna by dynamically selecting a pre-defined set of complex weights, which are combinations of amplitude and phase, for the antenna elements. The beam switching technique could also be exploited to implement dynamic electrical tilting. An essential difference between beam switching for data communication and beam switching adapted for positioning is that for positioning it is of less interest to form very narrow beams, since the necessary coverage of positioning reference signals needs to be ensured.

In addition to traffic antennas, which are configured for high isolation between cells and used for communication of user data, network nodes may also have additional antennas, which are configured for less isolation between the cells, and which will thus be appropriate for positioning purposes. By using dedicated positioning antennas, the forming of virtual positioning cells is not limited to what could be achieved by only changing certain parameters in traffic antennas. It is also here assumed that the network uses positioning radio resources, such as e.g. subframes. At the occurrence of a positioning radio resource, the network node switches antennas in said resource, such that a dedicated positioning antenna as the ones described above is used. The use of dedicated positioning antennas which form virtual positioning cells leads to reduced cell isolation, and improved conditions for positioning. The dedicated positioning antennas will normally not be used in non-positioning radio resources, where instead other antenna(s) will be used, which are optimized for communication of user data. An embodiment in which dedicated positioning antennas are used and where the positioning radio resource is a subframe, such as an LTE subframe, is illustrated in a flowchart in FIG. 13.

Figure 13:
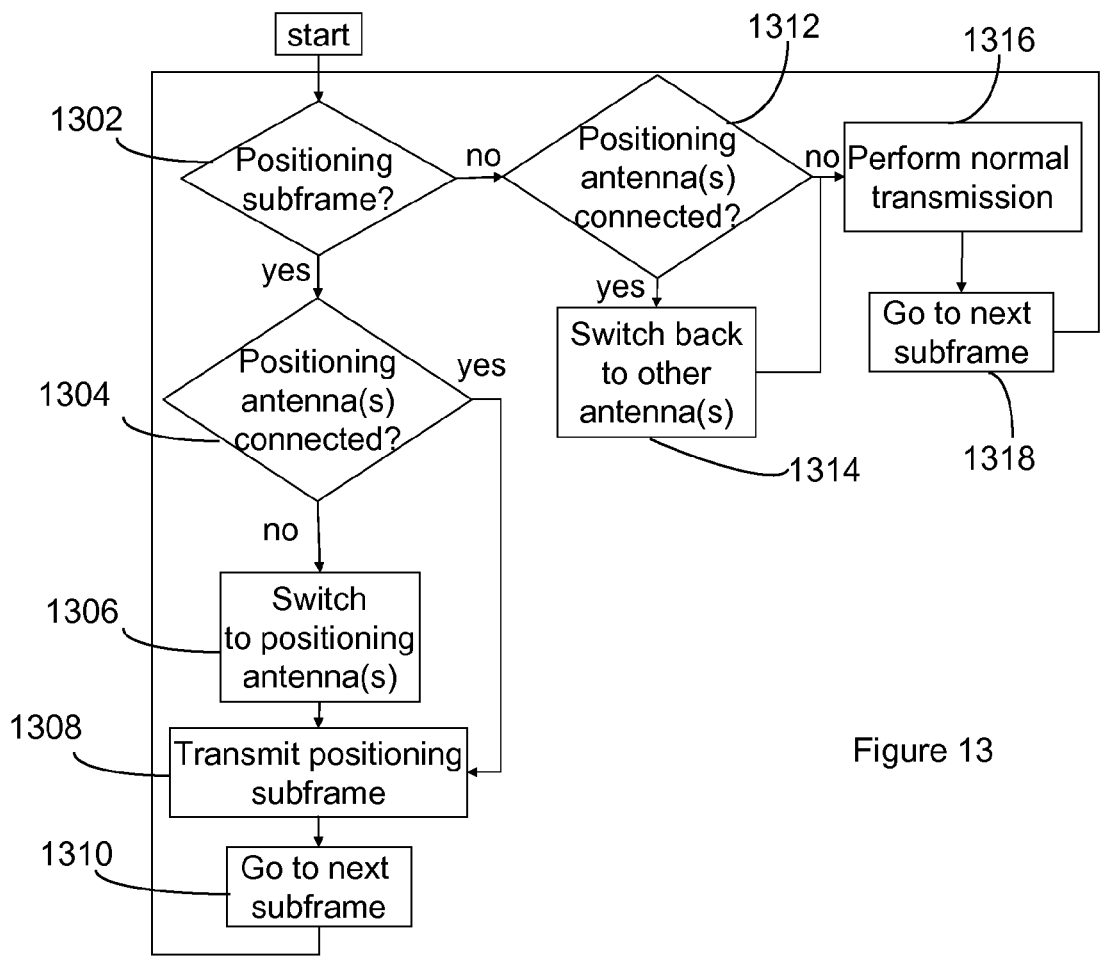

In the procedure illustrated by the flowchart in FIG. 13, it is first determined 1302 if a subframe to be transmitted is a positioning radio resource. If it is a positioning radio resource, it is determined 1304 if a dedicated positioning antenna is connected, and if not, it is connected 1306. When the dedicated positioning antenna is connected, the subframe is transmitted 1308 using the dedicated positioning antenna, i.e. an additional antenna optimized for positioning. If the subframe to be transmitted is not a positioning radio resource, it is determined 1312 which antenna that is connected. If a positioning antenna is connected, the antenna is switched 1314, so that a traffic antenna is connected instead. When the traffic antenna is connected, the subframe is transmitted 1316 using the traffic antenna. When a subframe is transmitted using the adequate antenna(s), the procedure starts over 1310, 1318 for the next subframe, and so forth.

In one embodiment, one or more separate antennas are used for positioning, i.e. antennas other than the antenna(s) used for communication of data traffic. These dedicated positioning antennas would be optimized for positioning purposes. The separate antennas could be co-located with antenna(s) used for communication of data traffic and/or co-located with a network node as illustrated in FIG. 3. The dedicated positioning antennas could also be remote, i.e. not placed in the same geographical location as the antenna(s) used for communication of data traffic and/or as the network node with which they possibly are associated, as illustrated in FIG. 10.

Figure 10:
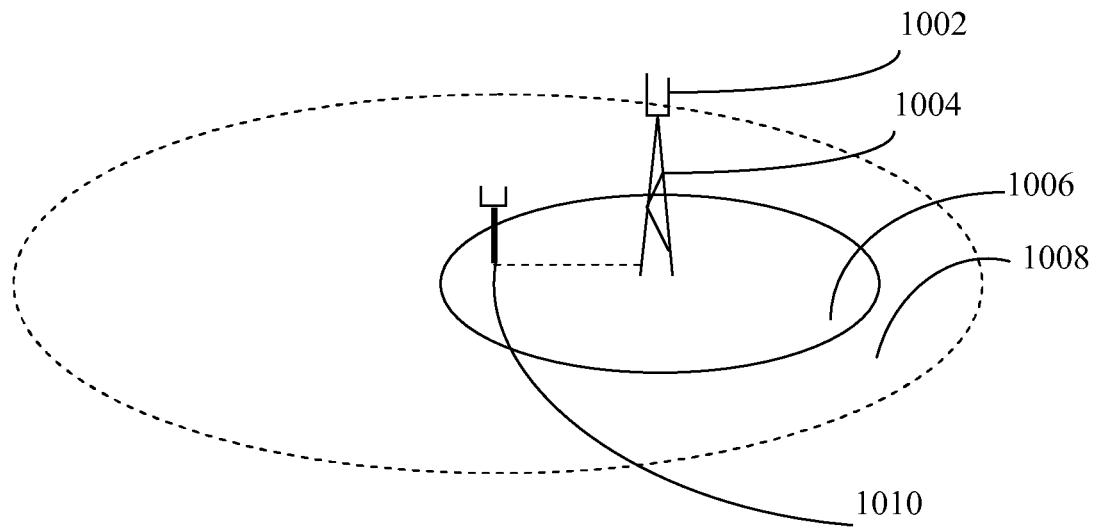
FIG. 10 is a schematic view illustrating the use of a remote dedicated positioning antenna according to one embodiment.

FIG. 10, which is a schematic view of an arrangement according to one embodiment, shows a remote or distributed dedicated positioning antenna 1010 associated with a network node 1004. A traffic antenna 1002 is co-located with the network node 1004. The traffic antenna 1002 forms a traffic cell 1006, and the dedicated positioning antenna 1010 forms a virtual positioning cell 1008. Both the antennas 1002 and 1010 are part of an antenna arrangement associated with the network node 1004.

Figure 11:
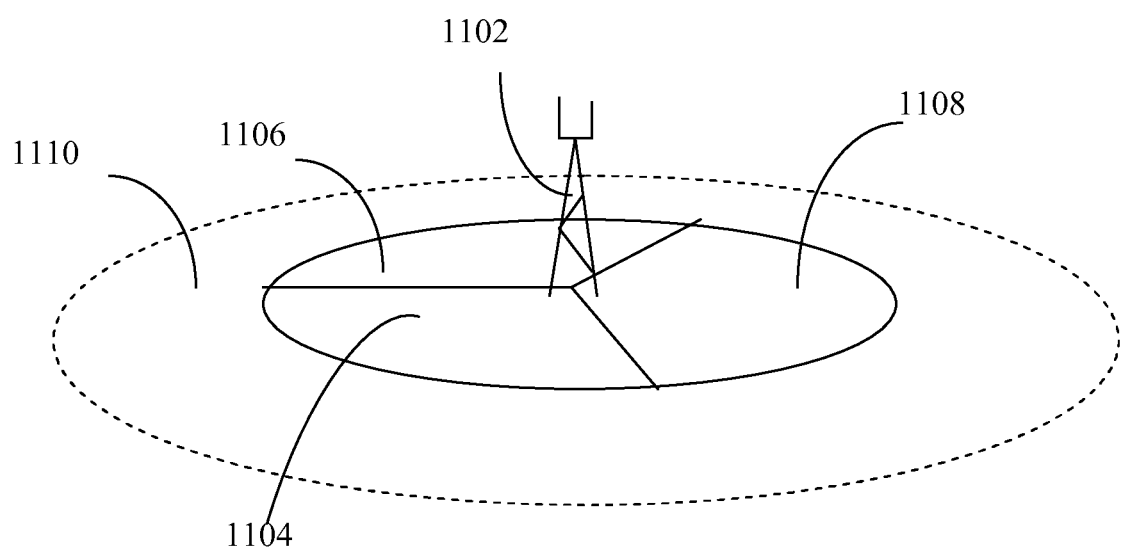
FIG. 11 is a schematic view illustrating several sector cells being covered by one virtual positioning cell according to one embodiment.

Typically, a traffic antenna represents a certain traffic cell. A positioning antenna, however, should represent a single location, since for example the OTDOA method needs measurements on signals originating from distinct locations. When using remote antennas, it is therefore the antenna position coordinates which need to be known in order to perform positioning, rather than the BS position coordinates. A dedicated positioning antenna should be designed and configured to achieve low cell isolation. Indeed, the traditional concept of isolated cells should not be applied for these antennas. For example multiple, physically co-located directional antennas may form a single virtual positioning cell as illustrated in FIG. 11 instead of each forming a separate virtual positioning cell. FIG. 11 will be further described below.

A dedicated positioning antenna is associated with a network node or a sector of a network node, such as a base station, or a relay node, or possibly, to a node or element, which may be dedicated for positioning, and is arranged to generate a certain coverage to form a virtual positioning cell. In one embodiment, the same power amplifier could be used for both a traffic antenna and a dedicated positioning antenna if both antennas are associated with the same e.g. network node. A power amplifier may be switched between separate antennas used for communication and for positioning, as illustrated in FIG. 14, on a time scale of e.g. milliseconds.

In the described embodiments, the configuration of an antenna arrangement is changed for a positioning radio resource, which may be in time, frequency or code, or any combination thereof.

In a dedicated positioning antenna scenario it is assumed that a network node can switch between different antennas on a short radio resource basis, e.g. on a subframe basis. The antennas may share the same power amplifiers, or alternatively have dedicated power amplifiers.

Figure 14:
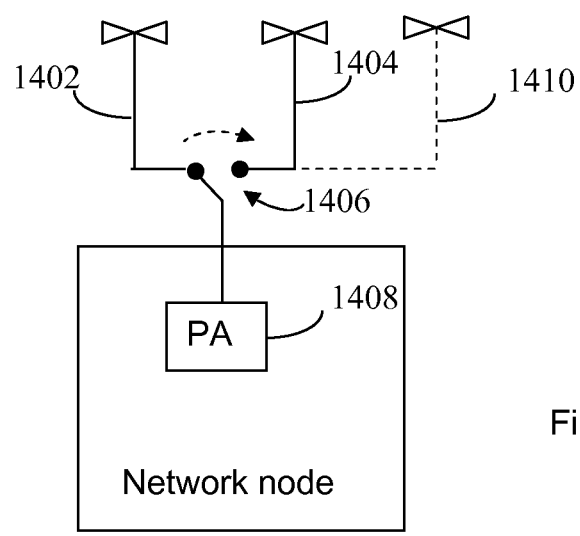
FIG. 14 is a schematic view illustrating antenna switching according to one embodiment of the invention.

Further, FIG. 14 illustrates the basic principle of antenna switching in embodiments where the positioning radio resource is a time resource occupying the full frequency and code space, i.e. some sort of subframe or other timeslot. For such embodiments, the traffic antenna(s) 1402 will be completely shut off during the positioning radio resources, and the positioning antenna(s) 1414 1410 will be completely shut off during non-positioning radio resources, i.e. the use of the different antennas is mutually exclusive in the time domain. The antennas can therefore share the same power amplifier 1408. When the positioning radio resources are in the frequency or code domain, the antenna switching will instead be performed for a certain set of frequencies or codes.

Below, the concept of virtual positioning cells will be described in more detail.

A virtual positioning cell is characterized by a unique identifier and the ability of transmitting and/or receiving positioning reference signals. A virtual positioning cell is always associated with a physical location, which may be separate from e.g. a BS location in case of remote antennas or distributed antenna systems, as mentioned above and illustrated in FIG. 10 and FIG. 11.

The reasons for the introduction of the notion of virtual positioning cells are as follows:

Not all network nodes or sectors may necessarily transmit and/or receive positioning signals if the coverage of the positioning reference signals in a certain area is sufficiently good when using a smaller set of antennas for transmitting or receiving positioning reference signals, as compared to the total amount of antennas used for communication of data traffic in the same area. In other words, it may suffice to use a subset of network nodes and/or antennas when performing positioning.

There may be network elements that transmit and/or receive positioning signals, but which serve some other purpose in the network than providing a data traffic service to UEs, for example equipment dedicated for positioning or TV-broadcast, e.g. DVB.

In an embodiment of the invention where dedicated positioning antennas are used, not all BSs in the network may need to be equipped with such antennas, which may be omni-directional antennas or may have a number of sectors different from the number of sectors used for data communication in the same base station. Some nodes in a network may form virtual positioning cells using adapted traffic antennas, while other nodes in the same network form virtual positioning cells using dedicated positioning antennas. Yet other nodes in the same network may use a combination of adapted traffic antennas and dedicated positioning antennas to form a virtual positioning cell. In other words, combinations of the different antenna alternatives are possible. Naturally, there may also be nodes in the same network, which do not form virtual positioning cells in positioning radio resources.

Except for some possible compatibility concerns and resource allocation issues, there may be no need, at least regarding DL positioning, for having multiple physically co-located directional virtual positioning cells, due to that the positioning methodology mainly requires that measurements are performed at distinct locations on signals originating from a mobile terminal, or that measurements are performed in a mobile terminal on signals originating from distinct locations. Therefore, the antennas used for positioning could be omni-directional in most cases.

In one embodiment, multiple traffic cells used for data communication can be combined into a single virtual positioning cell, i.e. the traffic antennas from several traffic cells are adapted to serve as positioning antennas in positioning radio resources, and are combined to form one virtual positioning cell. Particularly, if one BS controls several cells, e.g. a multi sector BS, the antennas for these different sector cells may be combined in such a way that they transmit identical messages, and thereby "mimic" the behavior of an omni-directional antenna placed at the location of the BS, as illustrated in FIG. 11.

FIG. 11, which is a schematic view of an arrangement according to one embodiment, shows three sector traffic cells 1104, 1106 and 1108, formed by three separate directional traffic antennas (not explicitly shown in the figure), each associated with a sector of a network node, e.g. a base station. In a positioning radio resource, the directional antennas are adapted to form one virtual positioning cell 1110, which covers all of the sector traffic cells 1104, 1106 and 1108, and appears to originate from an omni-directional antenna. Alternatively, the virtual positioning cell 1110 could be formed using one dedicated omni-directional positioning antenna.

In an embodiment where the directional antennas in e.g. different sector cells are used to form a virtual positioning cell, the antennas may or may not share the same power amplifier. If the antennas of the different sector cells are located close to one another, the approximation of the antenna positions as a single point in space, as in Equations (1a)-(1N), is probably reasonably accurate. If the antennas are separated by large distances, several candidate points in space, e.g. the separate locations of the antennas, could be used to describe the location of the combined antennas. Then, the coordinates of one of the separate antenna locations, e.g. the coordinates of the antenna location which is closest to the mobile terminal to be positioned, could be used when calculating the position estimate.

In an alternative embodiment, several distributed traffic antennas associated with one traffic cell are used to form several virtual positioning cells, i.e. one VPcell per antenna. In such an embodiment, the coverage of each of the virtual positioning cells will be smaller than the coverage of the traffic cell. In most other situations, a virtual positioning cell associated with a network node has an extended coverage as compared to a traffic cell associated with the same network node.

The transmissions of the positioning radio resource may or may not be synchronized across a network. In the latter case, different antennas, network nodes or sites may transmit in the positioning radio resource at different time instants.

Positioning measurements are performed on signals, within this document referred to as positioning signals or positioning reference signals, which are known to the measuring unit, e.g. a UE, an eNodeB, a relay or other network element. The positioning reference signals comprise at least one signal type which may or may not be used solely for positioning measurements.

When a positioning radio resource occurs in a system where the UEs perform the positioning measurements, the antenna arrangement configuration in a network node is adapted in order to ensure reception in the UEs of a sufficient number of signals of a sufficient strength from different locations in order to improve the positioning measurements. During non-positioning radio resources, another antenna arrangement configuration is used, which is optimized for high cell isolation. See e.g. FIG. 8 and FIG. 9.

Figure 12:
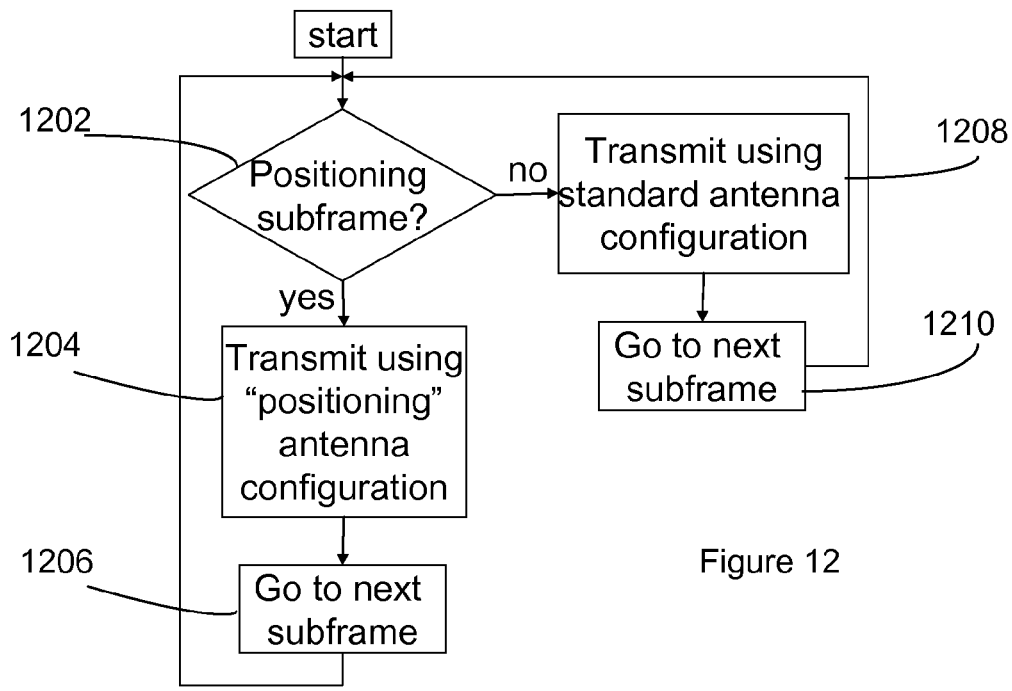
FIG. 12-13 are flow charts illustrating method steps according to different embodiments.

In one embodiment, a certain antenna configuration is selected in positioning radio resources. Such an embodiment, where the positioning radio resource is a time slot, such as an LTE subframe, is illustrated in a flowchart in FIG. 12. In the procedure illustrated by the flowchart in FIG. 12, it is first determined 1202 if a subframe to be transmitted is a positioning radio resource. If it is a positioning radio resource, the subframe is transmitted 1204 using a positioning antenna configuration, i.e. an antenna configuration suitable for positioning is selected when the positioning radio resource is transmitted. If the subframe is not a positioning radio resource, the subframe is transmitted 1208 using a traffic or standard antenna configuration. When a subframe is transmitted using the adequate antenna configuration, the procedure starts over 1206, 1210 for the next subframe, and so forth.

In another embodiment, more than one pre-defined antenna configuration is available for antennas used for positioning, of which one suitable configuration is selected by the network depending on the environment, time, interference situation, etc. For example, some areas may only need positioning measurements during certain hours of the day, e.g. when a shopping center is open or when another BS is turned on during busy hours. A positioning-specific Radio Resource Management (RRM) mechanism may be deployed in a network to enable automatic optimization of antenna configurations for positioning, which is applicable both for positioning-dedicated and non-dedicated antennas.

One advantage of the invention is that the cell isolation can be temporarily reduced, e.g. for positioning purposes. For positioning algorithms which rely on receiving signals from, or in, several network nodes or antenna sites, this is highly desired, and will lead to more accurate positioning, or to a reduction of the overhead required for positioning in the communication system.

In an embodiment where traffic antennas are reconfigured to act as positioning antennas, no additional hardware in form of antennas is required, provided that the antennas are able to change their configuration for the dedicated positioning resources without significantly affecting the antenna configuration during the non-positioning resources.

In an embodiment using dedicated positioning antennas, extra hardware in the form of one or more additional antennas is required in the relevant network nodes or antenna sites. One possibility to reduce the amount of additional hardware needed is to implement antenna switching after the power amplifier(s) in the radio unit(s) (RU) of the network nodes which are to comprise or feed the one or more additional antennas. This will result in that no additional power amplifiers are required. Antenna switching is possible due to that the additional dedicated positioning antenna(s) and the regular traffic antenna(s) are normally not simultaneously active in the same radio resources when certain radio resources, such as certain frequencies, timeslots or codes, are used for positioning.

It should be noted that FIG. 6 merely illustrates various functional units in the arrangement 600 in a logical sense. However, the skilled person is free to implement these functions in practice using any suitable software and/or hardware means. Thus, the invention is generally not limited to the shown structure of the arrangement 600. The procedure steps illustrated in FIGS. 4-5 and 12-13 and the antenna switching illustrated in FIG. 14 are also illustrated in a logical sense.

While the invention has been described with reference to specific example embodiments, the description is in general only intended to illustrate the inventive concept and should not be taken as limiting the scope of the invention. The different features of the exemplary embodiments above may be combined in different ways according to need, requirements or preference. Although the description has basically used LTE, base stations and subframes to exemplify different aspects of the invention, the scope of the invention is not limited hereto. The inventive concept could be applied in other cellular systems, such as e.g. UMTS, CDMA2000 or other systems using code based RATs, GSM or other time division based systems, multi-RAT systems or variants or successors of the previously mentioned systems. The unit forming a VPcell in positioning radio resources, in this document mainly exemplified by a network node such as a base station or a relay node, could in fact be any network element capable of transmitting signals to, or receiving signals from mobile terminals, which are to be positioned. As previously mentioned, the positioning radio resource could be in any of the dimensions time, frequency or code, or any combination thereof. The invention is generally defined by the following independent claims.

The invention claimed is:

1. A method in a network node for improving conditions for ground-based positioning of mobile terminals in a wireless communication system, comprising:
generating a traffic cell for user data traffic using an antenna arrangement of the network node configured for said generating;
adapting the configuration of the antenna arrangement, in a positioning radio resource, to form a virtual positioning cell, wherein the configuration of the antenna arrangement is adapted by switching between connecting one or more dedicated positioning antennas and connecting one or more traffic antennas, and
transmitting or receiving reference signals used for positioning in said positioning radio resource, using the adapted antenna arrangement.

2. The method according to claim 1, wherein the virtual positioning cell has a larger coverage area as compared to the traffic cell associated with the network node.

3. The method according to claim 1, wherein the virtual positioning cell is designed to at least partly overlap with at least one other virtual positioning cell.

4. The method according to claim 1, wherein the positioning radio resource occurs according to a predetermined schedule.

5. The method according to claim 1, wherein the positioning radio resource occurs dynamically according to received instructions.

6. The method according to claim 1, wherein the antenna arrangement is configured to generate the traffic cell in a radio resource not used for positioning.

7. The method according to claim 1, wherein the traffic cell and the virtual positioning cell are formed in different time-domain resources.

8. A network node adapted to improve conditions for ground-based positioning of mobile terminals in a wireless communication system, where said network node comprises:
an antenna arrangement comprising at least one antenna configured to generate a traffic cell for user data traffic;
an antenna arrangement control circuit configured to adapt the configuration of the antenna arrangement in a positioning radio resource, to form a virtual positioning cell, wherein the configuration of the antenna arrangement is adapted by switching between connecting one or more dedicated positioning antennas and connecting one or more traffic antennas; and at least one of a transmitting circuit configured to transmit, and a receiving circuit configured to receive, reference signals used for positioning in said positioning radio resource, using the adapted antenna arrangement.

9. The network node according to claim 8, wherein the antenna arrangement control circuit is further configured to adapt the configuration of the antenna arrangement to form the virtual positioning cell so that it has a larger coverage area as compared to the traffic cell associated with the network node.

10. The network node according to claim 8, wherein the antenna arrangement control circuit is further configured to adapt the configuration of the antenna arrangement to form the virtual positioning cell so that it at least partly overlaps with at least one other virtual positioning cell.

11. The network node according to claim 8, wherein the antenna arrangement control circuit is further configured to adapt the configuration of the antenna arrangement according to a predetermined schedule.

12. The network node according to claim 8, wherein the antenna arrangement control circuit is further configured to adapt the configuration of the antenna arrangement dynamically, according to received instructions.

13. The network node according to claim 8, wherein the antenna arrangement is configured to generate the traffic cell in a radio resource not used for positioning.

14. The network node according to claim 8, wherein the traffic cell and the virtual positioning cell are formed in different time-domain resources.

* * * * *